(12) United States Patent
Mori

(10) Patent No.: US 7,082,356 B2
(45) Date of Patent: Jul. 25, 2006

(54) METHOD AND DEVICE FOR DETECTING DAMAGED PARTS

(75) Inventor: Yuji Mori, Aichi (JP)

(73) Assignee: Fujitsu Limited, Kawasaki (JP)

( * ) Notice: Subject to any disclaimer, the term of this patent is extended or adjusted under 35 U.S.C. 154(b) by 232 days.

(21) Appl. No.: 10/721,459

(22) Filed: Nov. 26, 2003

(65) Prior Publication Data

US 2004/0117081 A1    Jun. 17, 2004

(30) Foreign Application Priority Data

Nov. 26, 2002   (JP)   .............................. 2002-341738

(51) Int. Cl.
*G06F 19/00* (2006.01)
(52) U.S. Cl. ............................................ 701/29; 701/1
(58) Field of Classification Search ................ 701/29, 701/34; 702/155, 36, 40
See application file for complete search history.

(56) References Cited

U.S. PATENT DOCUMENTS

| 4,811,250 A | 3/1989 | Steber et al. | |
|---|---|---|---|
| 2003/0036830 A1* | 2/2003 | Jones | 701/29 |
| 2004/0102880 A1* | 5/2004 | Brown | 701/29 |
| 2005/0131586 A1* | 6/2005 | Srack et al. | 701/1 |

FOREIGN PATENT DOCUMENTS

| CA | 2280570 | 2/2000 |
|---|---|---|
| EP | 244513 | 11/1987 |
| EP | 982673 | 3/2000 |
| JP | 62-261913 | 11/1987 |
| JP | 2000-222458 | 8/2000 |

OTHER PUBLICATIONS

English Language Abstract Japanese Patent Publication No. 2000-113060 published Apr. 21, 2000.
English Language Abstract Japanese Patent Publication No. 11-161711 published Jun. 18, 1999.
Japanese Office Action issued Nov. 15, 2005 in corresponding Japanese Application No. 2002-341738.

* cited by examiner

*Primary Examiner*—Thomas G. Black
*Assistant Examiner*—Christine M. Behncke
(74) *Attorney, Agent, or Firm*—Staas & Halsey LLP

(57) ABSTRACT

A method for identifying damaged parts of a vehicle, including those inside the body, in a prompt and accurate manner. The method measures the position of a transmitter attached at a predetermined point of a vehicle under test, by processing a transmitter signal received by a plurality of receivers (step S1). The displacement of the transmitter is then calculated by comparing the measured position of the transmitter with its corresponding reference position (step S2). Here, the reference position refers to the ideal position at which the transmitter is supposed to be when it is assumed that the vehicle is in normal state. The method then identifies damaged parts around the transmitter, based on the displacement (step S3).

11 Claims, 16 Drawing Sheets

PART POSITION TABLE 110

| VEHICLE MODEL | PART NUMBER | PART COORDINATES | DISPLACEMENT TOLERANCE | INFLUENCE RANGE |
|---|---|---|---|---|
| T86 | A0001 | X=100,Y=200,Z=300 | 1 mm | NONE |
| T86 | A0001 | X=100,Y=200,Z=300 | 5 mm | LOCAL |
| T86 | A0001 | X=100,Y=200,Z=300 | 10 mm | RANGE NO.1 |
| T86 | A0001 | X=100,Y=200,Z=300 | 20 mm | RANGE NO.2 |
| T86 | A0001 | X=100,Y=200,Z=300 | NO RESPONSE | RANGE NO.3 |
| .. | .. | .. | .. | .. |

FIG. 5

INFLUENCE RANGE TABLE

| VEHICLE MODEL | SOURCE PART NUMBER | RANGE NO. | AFFECTED PART NUMBER | DESCRIPTION |
|---|---|---|---|---|
| T86 | A0001 | 1 | A0001 | STEERING BOX |
| T86 | A0001 | 1 | A0002 | STEERING ROD |
| T86 | A0001 | 1 | A0003 | STEERING ARM |
| T86 | A0001 | 2 | A0001 | STEERING BOX |
| T86 | A0001 | 2 | A0002 | STEERING ROD |
| T86 | A0001 | 2 | A0003 | STEERING ARM |
| T86 | A0001 | 2 | A0004 | JOINT DISC |
| T86 | A0001 | 2 | A0005 | JOINT BALL |
| .. | .. | .. | .. | .. |

FIG. 6

METHOD AND DEVICE FOR DETECTING DAMAGED PARTS

BACKGROUND OF THE INVENTION

1. Field of the Invention

The present invention relates to a method and device for detecting damaged parts on a vehicle. More particularly, the present invention relates to a damaged part detection method and device for identifying such components that are damaged by mechanical deformation or the like.

2. Description of the Related Art

Vehicles damaged in an accident or for some other reason are brought to a car dealer or repair shop for repairing. Customers often request a rough estimate of repair cost before they actually give an order, since such information helps them to determine whether repairing their damaged car makes economic sense. The information about damage is also used by auto damage insurance companies, who have to calculate benefits payable. For prompt delivery of such information to an insurance company, a technique is proposed that sends damage information to an insurance company computer over a network (see, for example, Japanese Patent No. 3187377).

To make an estimate before beginning repairs, they have first to identify damage by viewing the vehicle in question from the outside. They also estimate internal damage from the degree of external damage that can be directly observed by visual inspection. The skill of estimating internal damage generally depends on the experience of a person who makes an appraisal. This means that the estimate tends to lack objectivity, varying from appraiser to appraiser.

To facilitate the task of estimating repair costs, some researchers have proposed a repair cost estimation system that uses three-dimensional measurement techniques to conduct a quantitative geometry measurement of a damaged car (see, for example, the Unexamined Japanese Patent Publication No. 11-161711 (1999)). This system first obtains geometry data of the vehicle under test by scanning its surface with a laser beam or the like. It then reproduces the three-dimensional shape of the vehicle by comparing and combining geometry data of the damaged vehicle with known geometry data of the same vehicle model. Based on the reproduced three-dimensional shape of the vehicle, the system identifies damaged portion quantitatively.

The above-described repair cost estimation system, however, is directed to detection of vehicle damage that can be visually identified. The conventional system is unable to detect internal damage to a vehicle, which can happen in car accidents. Components mounted inside the body could be damaged by the impact of car crash, even if they are remote from the part at which the vehicle collided. This type of damage cannot be identified by a simple visual inspection from the outside.

SUMMARY OF THE INVENTION

In view of the foregoing, it is an object of the present invention to provide a method for identifying damaged parts of a vehicle, including those inside the body, in a prompt and accurate manner.

To accomplish the above object, according to the present invention, there is provided a method for detecting damaged parts. This method comprises the following steps: (a) measuring a position of a transmitter by processing a transmitter signal received by a plurality of receivers, the transmitter being attached at a predetermined point of a vehicle; (b) calculating displacement of the transmitter by comparing the measured position with a reference position of the transmitter, the reference position being a position at which the transmitter is supposed to be when the vehicle is in normal state; and (c) identifying damaged parts around the transmitter, based on the displacement of the transmitter.

To accomplish the above object, according to the present invention, there is provided a device for detecting damaged parts. This device comprises the following elements: a plurality of receivers that receives a transmitter signal sent from a transmitter attached at a predetermined point of a vehicle; a transmitter locator that measures a position of the transmitter by processing the transmitter signal received by the receivers; a displacement calculator that calculates displacement of the transmitter by comparing the measured position with a reference position of the transmitter, the reference position being a position at which the transmitter is supposed to be when the vehicle is in normal state; and a damaged part detector that identifies damaged parts around the transmitter, based on the displacement of the transmitter.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 shows an example of data structure of a part position table.

FIG. 6 shows an example of data structure of an influence range table.

DESCRIPTION OF THE PREFERRED EMBODIMENTS

Figure 1:
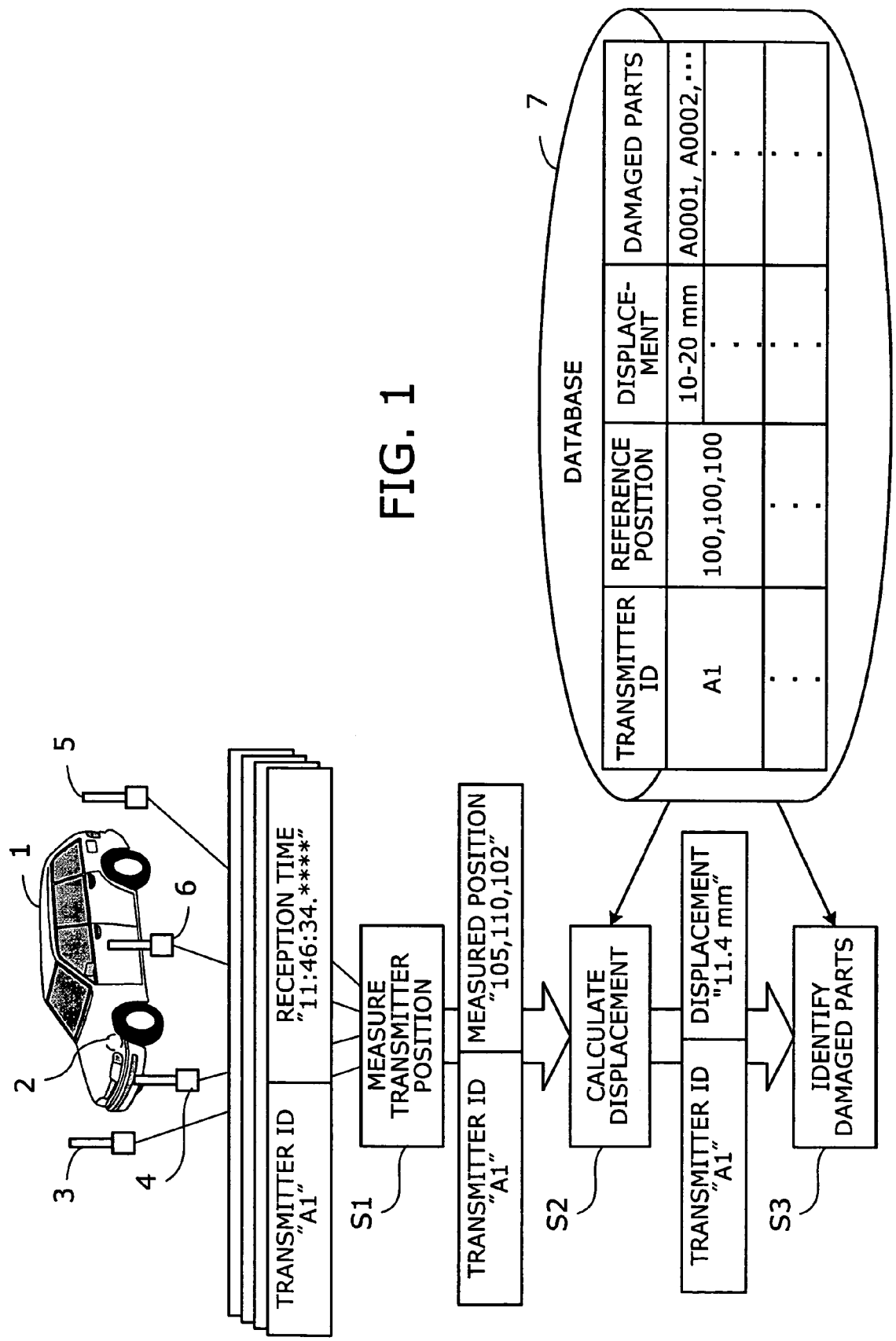
FIG. 1 shows the concept of a method in which the present invention is embodied.

Preferred embodiments of the present invention will be described below with reference to the accompanying drawings, wherein like reference numerals refer to like elements throughout. The following description will outline the invention and then moves to more specific explanation of how the invention will be applied.

FIG. 1 shows the concept of a method in which the present invention is embodied. Here, a transmitter 2 is attached at a predetermined point on a vehicle 1. The damaged part detection method of the present invention starts with measuring the position of this transmitter 2 by processing a transmitter signal received by a plurality of receivers 3 and 4, 5, and 6 (step S1). While, for simplicity purposes, FIG. 1 shows only one transmitter 2, the vehicle 1 may be equipped with a number of like transmitters in the actual implementation. Those transmitters 2 may be mounted inside of the vehicle 1, in which case the signals (e.g., electromagnetic waves) transmitted from transmitters 2 should pass through the body plate of the vehicle 1.

Referring to FIG. 1, the position of the transmitter 2 can be identified based on the time the transmitter signal arrives at each receiver 3 to 6. More specifically, the receivers 3 to 6 receive the same signal at different places and at different times. The difference in reception time between two receivers is proportional to the difference between their distances from the transmitter 2. We can therefore calculate the position of the transmitter 2 from the difference in distances from the transmitter 2 to the receivers 3 to 6.

More specifically, the transmitter 2 outputs a signal containing its own transmitter ID, and each receiver 3 to 6 creates a record including the received transmitter ID and reception time. There is, on the other hand, a table that shows the position of every receiver 3 to 6. With reference to this table, the method learns receiver locations and then determines the position of the transmitter 2, based on the relative geometric relationships between the receivers 3 to 6 and transmitter 2. The data record produced in this way contains the transmitter ID and position (measured position) of the transmitter 2.

Now that the position of the transmitter 2 has been measured, the next step is to figure out the amount of displacement by comparing the measured position of the transmitter 2 with its corresponding reference position (step S2). Here, the reference position means where the transmitter 2 is supposed to be, assuming that there is no damage to the vehicle 1. In an actual implementation, a database 7 is established beforehand to store the transmitter ID and reference position of each transmitter 2 in an associated manner. When the transmitter ID of the transmitter 2 is obtained as a result of position detection, the database 7 provides its associated reference position, thus enabling the displacement to be calculated as a difference between the measured position and reference position.

The next step is to evaluate the displacement to identify damaged parts around the transmitter 2 (step S3). More specifically, the database 7 stores a list of components that are likely to be damaged in the case a certain amount of displacement of the transmitter 2 is present. The list may contain multiple sets of data corresponding to different displacement ranges, and the database 7 has a plurality of such lists each associated with a particular transmitter ID. When the displacement of a transmitter 2 is calculated, the database 7 provides a group of components associated with the transmitter ID and displacement value. Those components are regarded as damaged parts of the vehicle 1.

Suppose that the transmitter 2 has been moved out of its proper place due to a mechanical impact on the vehicle 1. The proposed damaged part detection method measures the current position of the transmitter 2, figures out the amount of displacement, and identifies components around the transmitter 2 that are likely to be damaged. In this way, damaged parts of the vehicle 1 are detected easily. Transmitters 2 placed inside the vehicle 1 permit us to locate such damage that could not be revealed by a superficial visual inspection.

When a damage is found, the vehicle 1 is then brought to a repair shop. Before beginning repair work, however, they has to obtain all necessary spare parts for replacement. Car dealers and repair shops generally procure such car parts from auto parts stores. The parts store man asks questions to the customer about what the car's name is, which part is needed, and so on, and then identifies the part number of every necessary components by using a parts database system.

The parts database system classifies car parts into several major categories such as: engine components, electrical components, body components, and chassis components. Each major category is divided into several minor categories, and each of the minor categories is further broken down into more specific subcategories. Parts stores use this classification system to narrow down the range of search until they reach the exact part that their customer needs to buy.

The above-described parts database system works fine when the customer's order is straightforward. However, in the case of repairing a car that is damaged in a crash, a large number of spare parts have to be ordered, and the task of identifying correct part numbers for those parts could be extremely difficult and burdensome, particularly when the parts span multiple categories. A customer may give them an ambiguous order such as "all components constituting the front left block" of a particular vehicle. With a conventional car parts database system alone in this case, it is very hard to obtain a correct and complete list of necessary components.

Another difficulty is that the categories of some class of auto parts are not always obvious. For example, it is not easy to determine whether engine mounts (i.e., parts used to fix the engine on the frame) belong to the category of engine components or that of chassis components.

As can be seen from the above, ordering auto parts is an error-prone process, and a wrong order would cause a delay in repair jobs because of the lack of necessary spare parts. The present embodiment addresses this problem by implementing the proposed damaged part detection method on a computer, thus enabling the computer to promptly generate orders for correct spare parts. This system does not require the purchasers to have knowledge about component categories, names, or whatsoever, thus completely liberating them from the risk of specifying wrong things.

A more specific embodiment of the present invention will now be described in detail below. In the following section, the computer implementing the proposed damaged part detection method is referred to as the "damaged part detection device." Each transmitter's identifier (transmitter ID), is equal to the identifier of the component equipped with that transmitter. It is also assumed that transmitters are so small that the position of a transmitter can be equated with the position of the component equipped with that transmitter.

Figure 2:
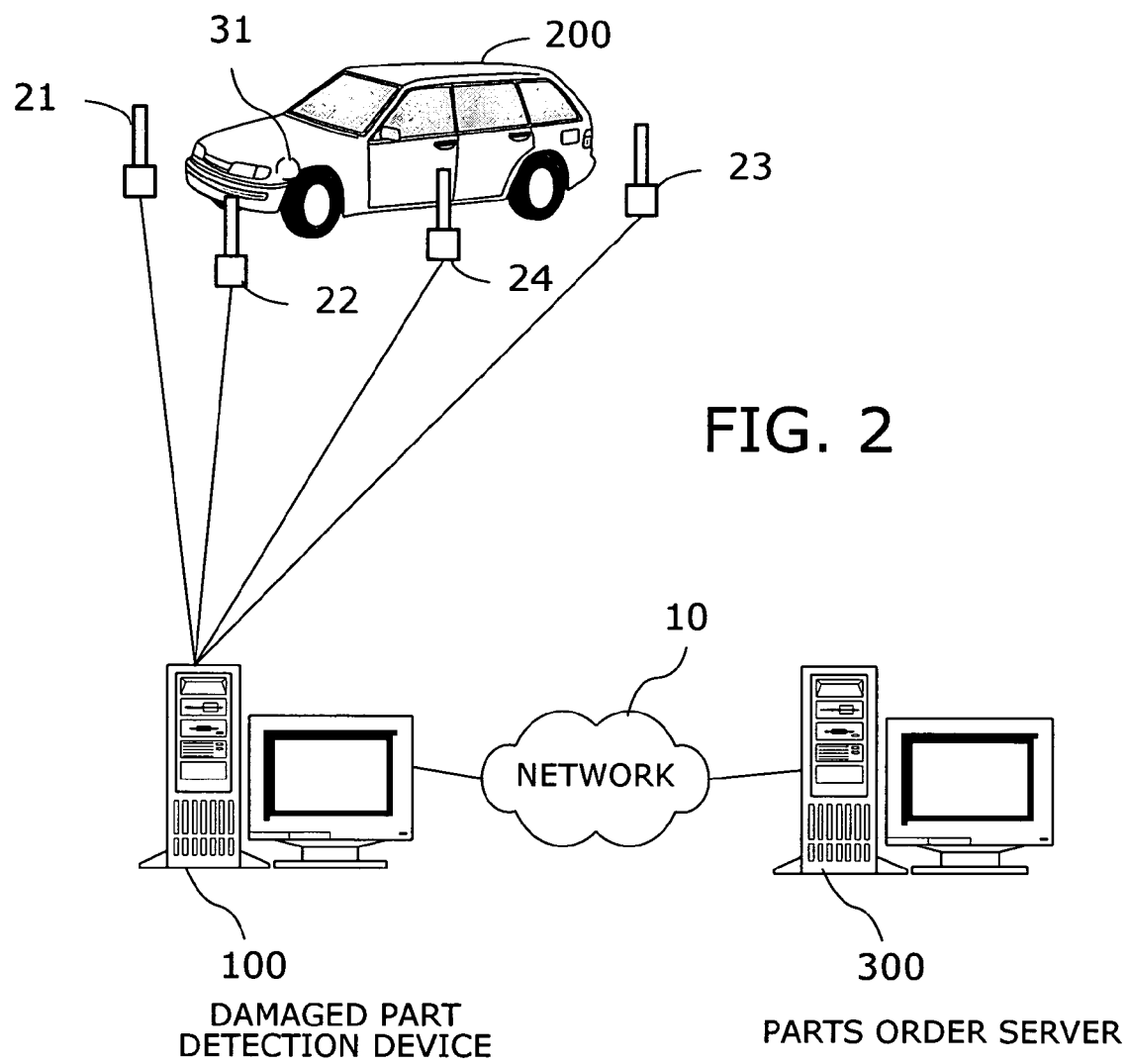
FIG. 2 is a system block diagram of the present embodiment.

FIG. 2 is a system block diagram of the present embodiment of the invention, in which a damaged part detection device 100 and a parts order server 300 are linked via a network 10. Receivers 21 to 24 are connected to the damaged part detection device 100 to collect signals from a transmitter 31 attached to a component of a vehicle 200.

According to the present embodiment, the receivers 21 to 24 receive electromagnetic waves produced by the transmitter 31, and based on the received signals, the damaged part detection device 100 measures the distance between the transmitter 31 and each receiver 21 to 24 so as to figure out the position of the transmitter 31. The damaged part detection device 100 then compares the obtained transmitter position with its corresponding reference position (i.e., where the transmitter-equipped component lies in normal situation), thus calculating displacement of the component. The damaged part detection device 100 identifies damaged parts by evaluating the displacement and sends a spare parts order to the parts order server 300 over the network 10.

Figure 3:
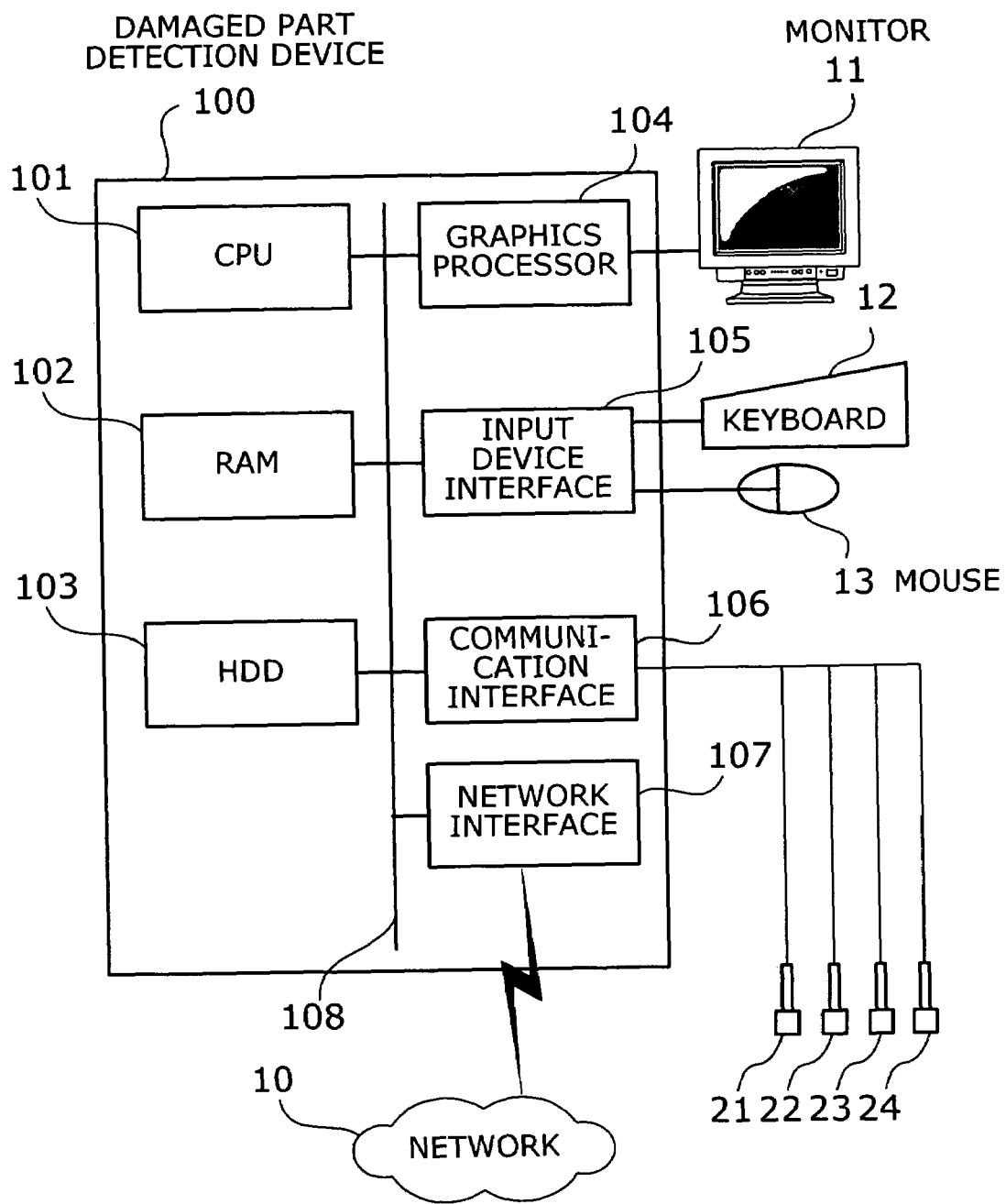
FIG. 3 shows an example of a hardware platform for a damaged part detection device in which the present invention is embodied.

FIG. 3 shows an example of a hardware platform for the damaged part detection device in which the present invention is embodied. The illustrated damaged part detection device 100 employs a central processing unit (CPU) 101 to control the entire system, while interacting with other elements via a common bus 108, which include: a random access memory (RAM) 102, a hard disk drive (HDD) 103, a graphics processor 104, an input device interface 105, a communication interface 106, and a network interface 107.

The RAM 102 temporarily stores at least part of operating system (OS) programs and application programs that the CPU 101 executes, in addition to other various data objects manipulated at runtime. The HDD 103 stores program and data files of the operating system and various applications. The graphics processor 104 produces video images in accordance with the commands from the CPU 101 and displays them on the screen of an external monitor 11 coupled thereto. The input device interface 105 is used to receive signals from external input devices, such as a keyboard 12 and a mouse 13. Those input signals are supplied to the CPU 101 via the bus 108.

A plurality of receivers 21 to 24 are connected to the communication interface 106, which receives data of transmitter signals that the receivers 21 to 24 have received. The network interface 107 is linked to a network 10, allowing the CPU 101 to exchange data with other damaged part detection devices (not shown) over the network 10.

Data processing functions of the present invention can be provided as software programs that will run on the hardware platform described above. While FIG. 3 illustrates a typical platform for the damaged part detection device 100, the same or similar hardware structure may also be applied to the parts order server 300.

Figure 4:
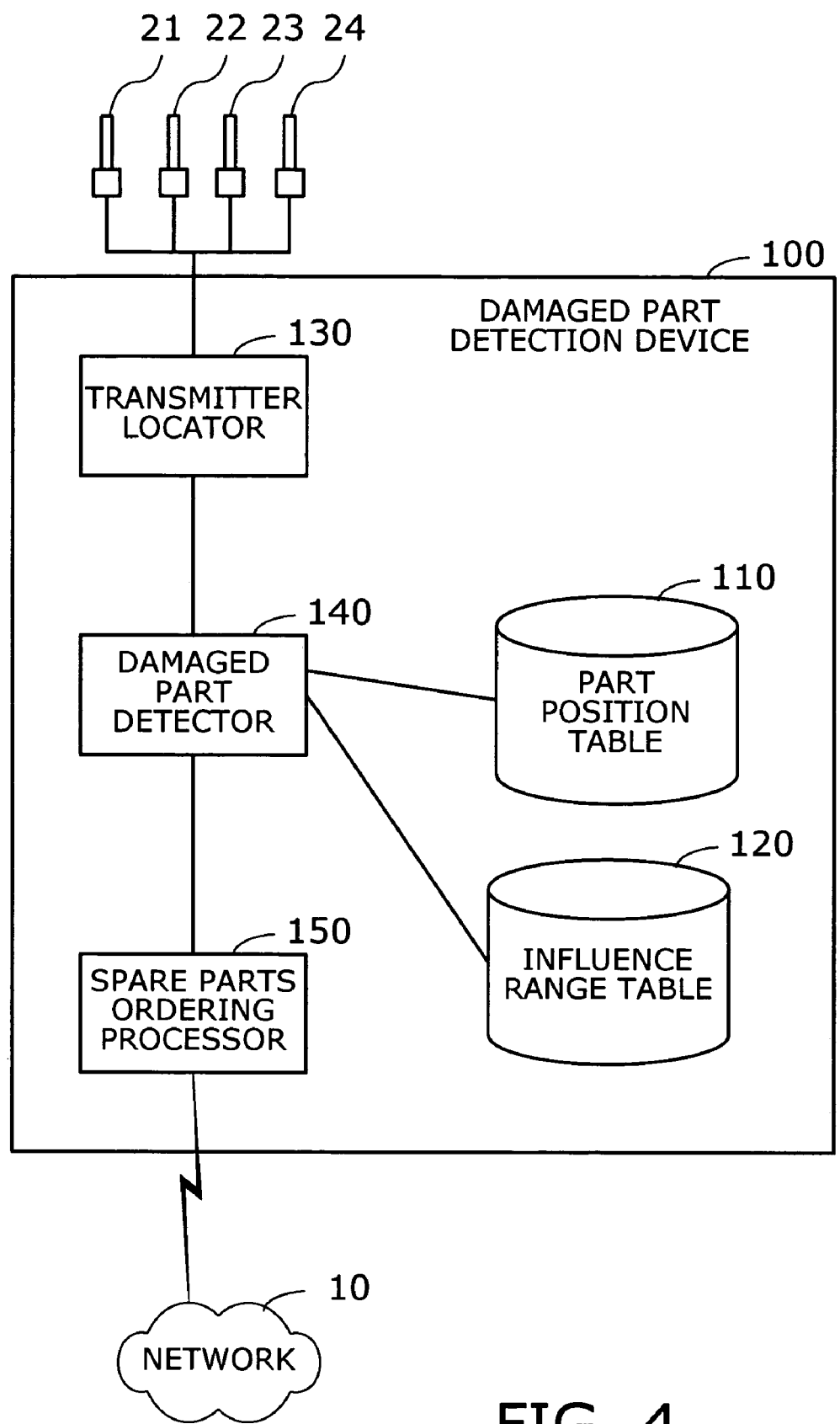
FIG. 4 is a block diagram showing the internal structure of the damaged part detection device.

FIG. 4 is a block diagram showing the internal structure of the damaged part detection device 100. This damaged part detection device 100 has a part position table 110, an influence range table 120, a transmitter locator 130, a damaged part detector 140, and a spare parts ordering processor 150. Actually, the part position table 110 and influence range table 120 are part of a database that the damaged part detection device 100 manages.

The part position table 110 stores the position of every transmitter-equipped component attached to a vehicle 200. Part positions in this table 110 represent the coordinates of each component, assuming that the vehicle 200 is placed exactly at a prescribed location in a given three-dimensional measurement space, in which receivers 21 to 24 are arranged. The part position table 110 also defines the relationship between displacement values and influence ranges, which will be described later.

The influence range table 120 holds a list of parts (damaged parts) within an influence range of each transmitter-equipped component. That is, this influence range table 120 indicates which parts would be affected by displacement of each particular transmitter-equipped component.

The receivers 21 to 24 supply the transmitter locator 130 with data about transmitters. The transmitter locator 130 then measures distances between receivers and transmitters, and based on that measurement, it calculates the actual location of each transmitter. The measured transmitter positions are passed to the damaged part detector 140.

The damaged part detector 140 compares the measured position of each transmitter-equipped component with its reference position at which the component is supposed be, thereby figuring out the difference between them. Here, the part position table 110 is used to get the reference position of each component. The damaged part detector 140 then determines the influence range corresponding to the component displacement, consulting again the part position table 110. Lastly, the damaged part detector 140 looks up the influence range tablet 120 to find other components in the influence range. The information on those components (i.e., or damaged parts) is the passed to the spare parts ordering processor 150. Upon receipt of the damaged parts information, the spare parts ordering processor 150 sends ordering information to the parts order server 300 over the network 10 to purchase spare parts for the damaged parts.

FIG. 5 shows an example of data structure of the part position table 110. The illustrated part position table 110 has the following data fields: vehicle model, part number, part coordinates, displacement tolerance, and influence range. Each row (i.e., each associated set of data fields) of this table 110 constitutes a single record.

The vehicle model field stores the identification number of the vehicle 200 under test. In the example of FIG. 5, this field contains a model number "T86."

The part number field shows the identification number of each transmitter-equipped component. In the example of FIG. 5, this field contains a part number "A0001."

The part coordinates field stores coordinates of each component in normal condition, assuming that an undamaged vehicle 200 is placed at a prescribed location in the three-dimensional measurement space. In the example of FIG. 5, this field contains part coordinates "X=100, Y=200, Z=300." at which the part "A0001" is supposed to be.

The displacement tolerance field stores a displacement tolerance, i.e., a critical value of displacement that defines a particular influence range. In the present embodiment, a plurality of tolerances are defined for each single component. The example of FIG. 5 shows five records with respective displacement tolerances of "1 mm," "5 mm," "10 mm," "20 mm," and "No Response" for the same part number "A0001." More specifically, the top most record has a displacement tolerances of "1 mm," meaning that it is applied when the displacement $\Delta d$ is in the range of $0 \leq \Delta d \leq 1$ [mm]. Likewise, the second record has a displacement tolerance of "5 mm," meaning that it is applied when $1 < \Delta d \leq 5$. The third record has a displacement tolerance of "10 mm," meaning that it is applied when $5 < \Delta d \leq 10$. The fourth record has a displacement tolerance of "20 mm," meaning that it is applied when $10 < \Delta d \leq 20$.

The displacement tolerance field of the fifth record has no particular value, but reads "No Response." This indicates that the record will be applied when no response signal is detected from the transmitter. The component has probably dropped off in such a situation. The fifth record is also applicable when the displacement $\Delta d$ exceeds 20 mm.

The influence range field stores information used to determine what range of components should be construed as being affected when a specific displacement is given. In the example of FIG. 5, the influence range definition for displacement tolerance "1 mm" reads "None." This means that there is no damage on the components around the transmitter. The next record has a displacement tolerance of "5 mm," and its influence, range field reads "Local." This means that the component under test ("A0001" in the present example of FIG. 5) is probably damaged but other parts have no problem. The influence range is set to "Range No. 1" for displacement tolerance "10 mm." Likewise, "Range No. 2" is for tolerance "20 mm," and "Range No. 3" for "No Response." "Range No. 1," "Range No. 2," and "Range No. 3" are group identifiers of damaged parts, indirectly showing which components are likely to be damaged.

FIG. 6 shows an example of data structure of the influence range table 120. The illustrated influence range table 120 has the following data fields vehicle model, source part number, range No., affected part number, and description. Each row (i.e., each associated set of data fields) of this table 120 constitutes a singles record.

The vehicle model field stores the identification number of the vehicle 200 under test. In the example of FIG. 6, this field contains a model number "T86."

The source part number field shows the identification number of a transmitter-equipped component. In the example of FIG. 6, this field contains a part number "A0001."

The range No. field stores information used to determine what range of components should be construed as being affected when a specific displacement tolerances is given in association with a specific source part number. The example of FIG. 6 shows two such numbers "1" and "2" in the influence range table 120.

The affected part number field shows the identification code of each component that would be affected by displacement of the component specified in the source part number field. In the example of FIG. 6, this field suggests that when the displacement of a component "A0001" is rated "Range No. 1," the very component "A0001" and two other components "A0002" and "A0003" are construed as being damaged. It also suggests that when the displacement of the same component "A0001" is rated "Range No. 2," the very component "A0001" and four other components "A0002," "A0003," "A0004," and "A0005" are construed as being damaged.

The description field accepts any text regarding the component specified in the affected part number field. In the example of FIG. 6, this field contains the names of affected parts. More specifically, it provides the following information: component "A0001" is a steering box, component "A0002" is a steering rod, component "A0003" is a steering arm, component "A0004" is a joint disk, and component "A0005" is a joint ball.

The part position table 110 of FIG. 5 and influence range table 120 of FIG. 6 enable the proposed detection device to identify a damaged component or a group of damaged components, when a specific displacement of a transmitter-equipped component is observed. Suppose, for example, that the component "A0001" exhibits a displacement of 8 mm. First, the part position table 110 tells us that the displacement is rated "Range No. 1." This influence range field value "Range No. 1," together with the part number "A0001," is then used as the keyword in searching the influence range table 120. The first three records extracted from the influence range table 120 tell us that the following components fall within the influence range a steering box with part number "A0001," a steering rod with part number "A0002," and a steering arm with part number "A0003." These components are construed as damaged parts.

Figure 7:
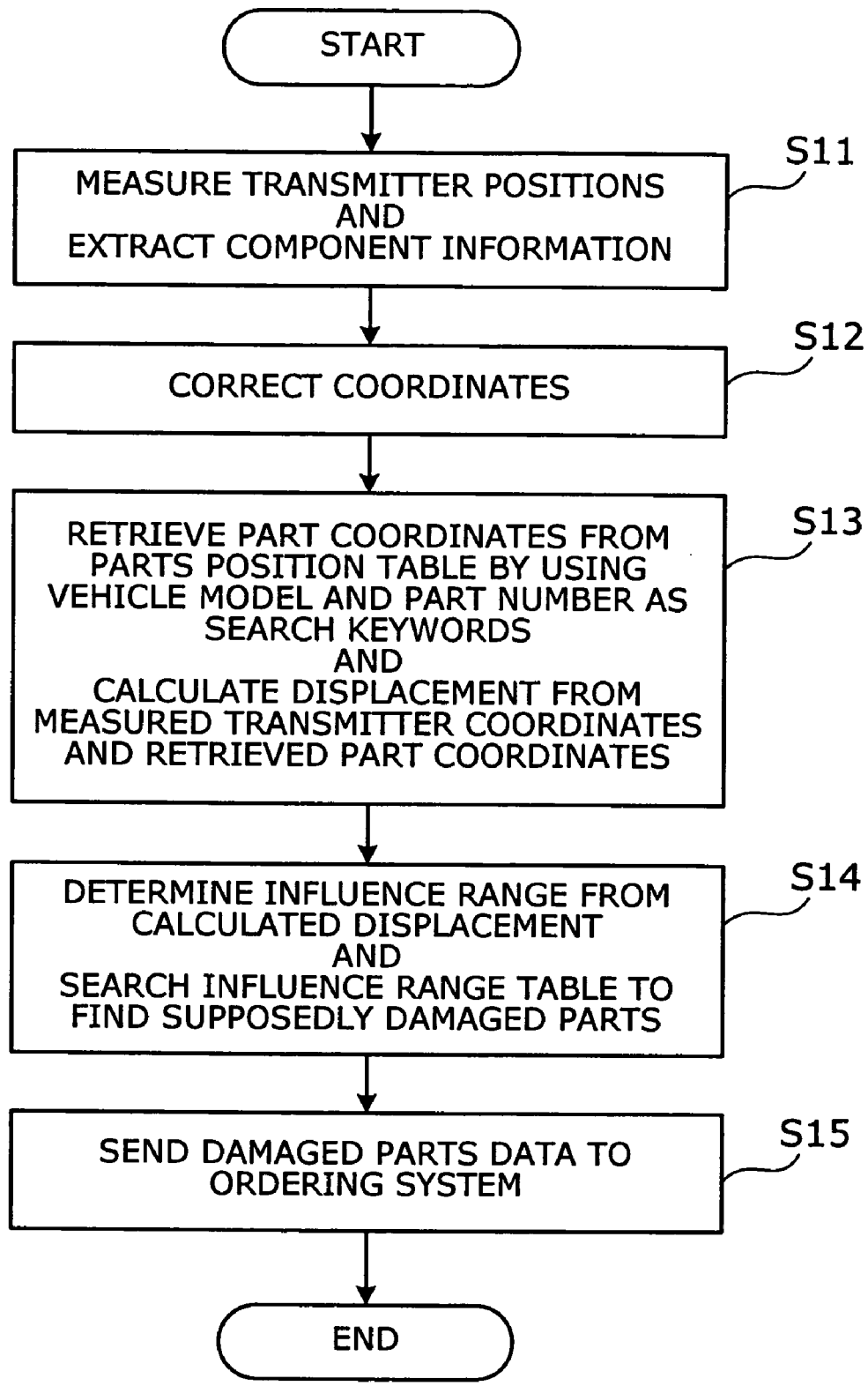
FIG. 7 is a flowchart showing how damaged parts are identified and how a spare parts order is placed for them.

The next section will now describe a process of automatically detecting damaged parts and ordering spare parts for replacement. FIG. 7 is a flowchart showing this process. It is assumed here that a vehicle 200 is tested with the damaged part detection device 100 discussed in FIGS. 4 to 6. The following explains the process in the order of step numbers.

(S11) Based on the data sent from receivers 21 to 24, the transmitter locator 130 measures the position of each transmitter attached to the vehicle 200 under test. Besides permitting position detection, the transmitter signal delivers some pieces of information about the component to which the transmitter is attached. They include vehicle model and part identification code, and the transmitter locator 130 extracts such component information from the received signal. The extracted component information and measured transmitter position are sent together to the damaged part detector 140.

(S12) Upon receipt of component information and transmitter positions from the transmitter locator 130, thee damaged part detector 140 invokes a geometry correction process to obtain correct coordinates of transmitters.

Coordinate correction is required for the following reason. Ideally, the transmitter locations on an undamaged vehicle agree with the part coordinates described in the part position table 110, assuming that the vehicle is situated exactly at the prescribed location in the three-dimensional measurement space. In real life, however, inaccuracies are inevitable. When the vehicle 200 under test is brought into the measurement space, it can hardly stop at the intended location or orientation, and without appropriate correction, all the transmitters on the vehicle 200 would appear as if they were displaced. The damaged part detector 140 is therefore designed to calculate a position offset (including orientation error) of the vehicle 200 and cancel it when detecting actual transmitter positions.

(S13) The damaged part detector 140 retrieves part coordinates from the part position table 110 by using vehicle model and part number as search keywords. It then compares the retrieved part coordinates with the measured transmitter coordinates supplied from the transmitter locator 130, thus calculating displacement of each transmitter-equipped component.

(S14) Based on the displacement of components, the damaged part detector 140 determines which components are likely to be damaged.

More specifically, the damaged part detector 140 consults the part position table 110 to find such records that agree with given component information (i.e., vehicle model and part identification code). Then, from among those records, the damaged part detector 140 extracts a particular record whose displacement tolerances value is relevant to the calculated displacement (more precisely, a record whose displacement tolerance value is the smallest of those that exceed the given displacement value). The damaged part detector 140 picks up the influence range field of the extracted record. If this field is "NONE," then nothing is damaged. If it is "LOCAL," then only the transmitter-equipped component is construed as being damaged. If the influence range field has a code such as "Range No. 1," the damaged part detector 140 searches the influence range table 120 for records that match the given component information vehicle model, part identification code) and the Range No. in the influence range field. The retrieved records indicate damaged parts in their affected part number field, and the part numbers of those damaged parts are passed to the spare parts ordering processor 150.

(S15) The spare parts ordering processor 150 compiles a spare parts order including their parts numbers of damaged parts and transmits it to the parts order server 300.

The damaged part detection device 100 goes through the above steps to identify damaged parts and send an appropriate spare parts order to the parts order server 300.

Figure 8:
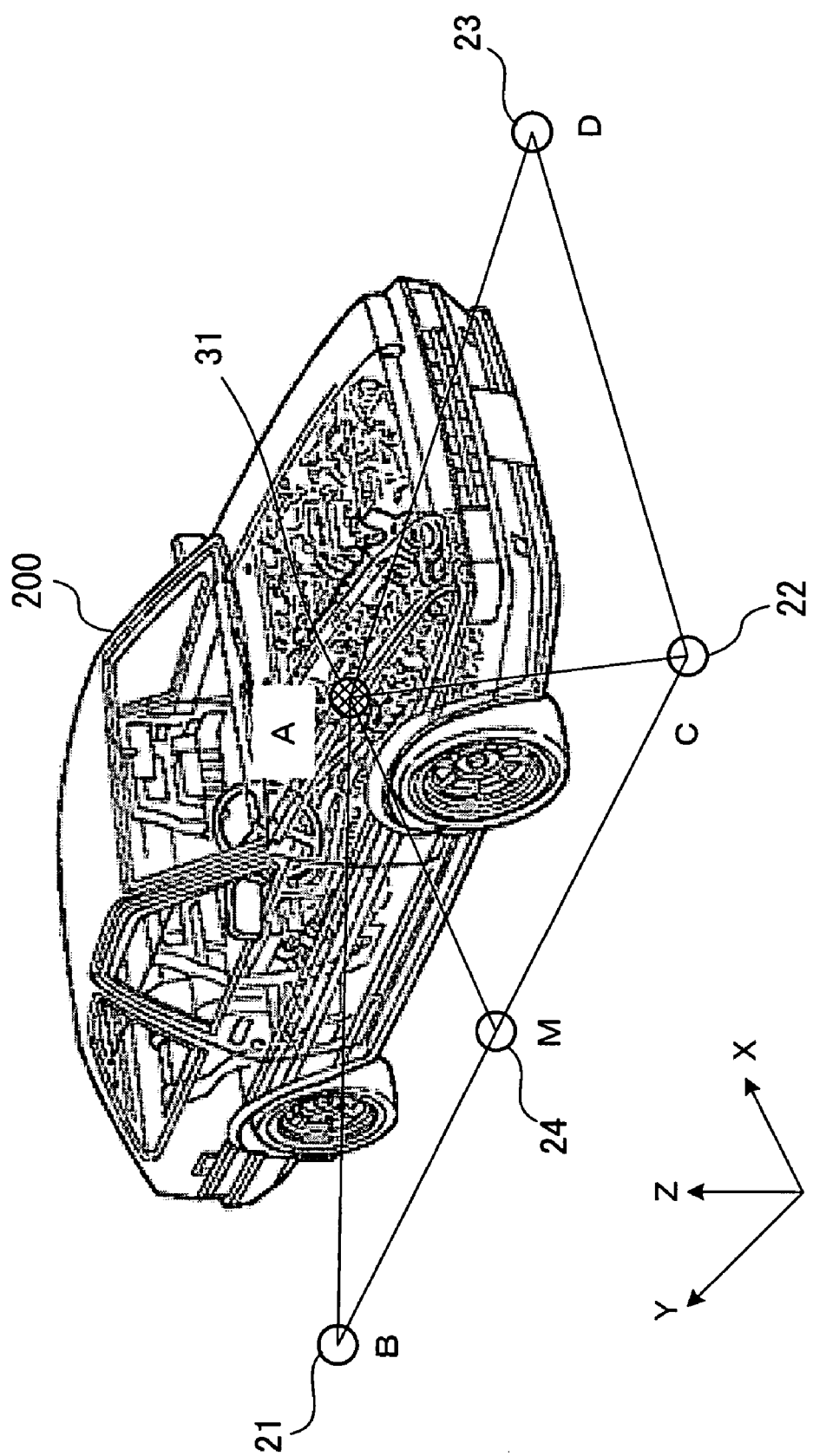
FIG. 8 is a conceptual view of position measurement for detecting components having a transmitter.

The next section will now provide more details about how to locate damaged parts. FIG. 8 is a conceptual view of position measurement for transmitter equipped components. As can be seen from FIG. 8, the measurement site has four receivers 21 to 24, which are placed at predetermined positions in a predefined three-dimensional measurement space. It should be noted that one receiver 24 is located at the midpoint of the straight line segment between other receivers 21 and 22. The vehicle 200 under test has been brought into the measurement site. FIG. 8 shows an on-vehicle transmitter 31, whose coordinates in the three-dimensional measurement space is to be measured by the damaged part detection device 100.

Let X, Y, and Z be the three coordinate axes of the three-dimensional measurement space. Point A is the position of the transmitter 31, and points B, C, D, and M are the positions of receivers 21, 22, 23, and 24, respectively. The coordinates of points B, C, D, and N are known, while those of point A is unknown. To calculate the coordinates of point A, let us consider two triangles ABC and ACD.

Figure 9:
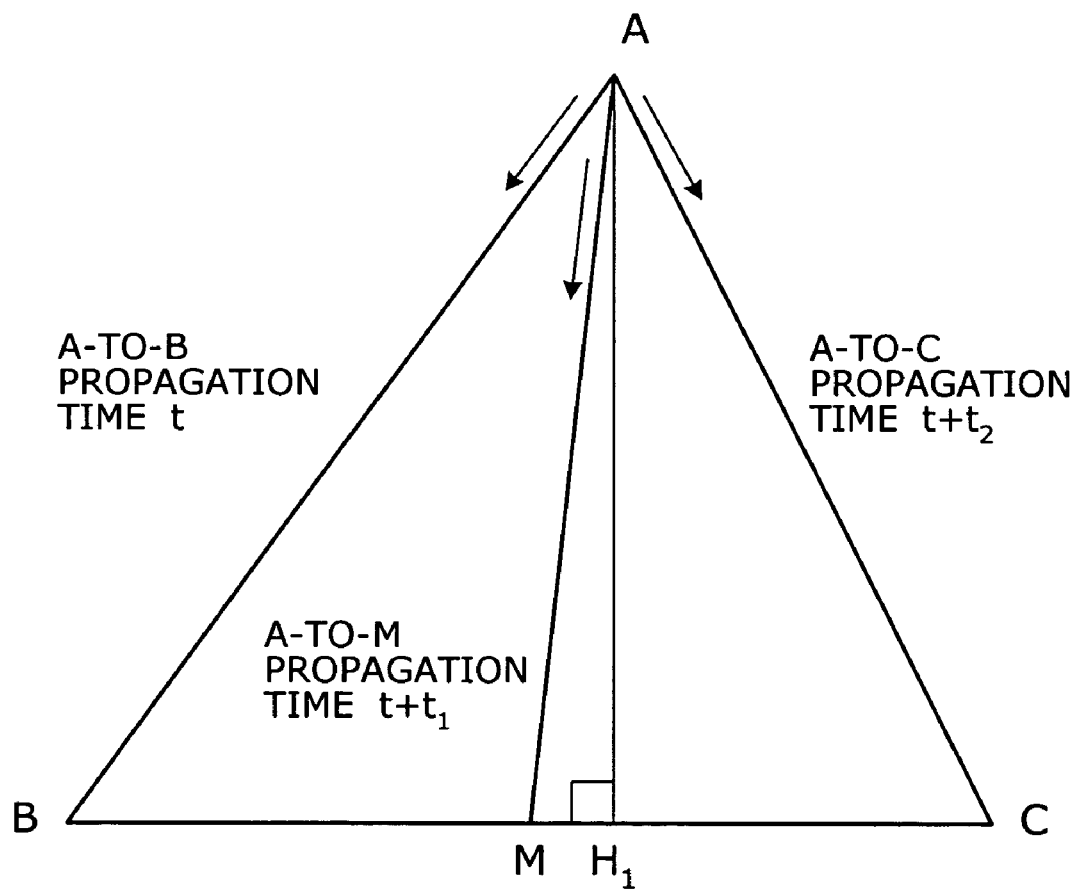
FIG. 9 shows a triangle ABC.

FIG. 9 shows a triangle ABC, where A, B, and C are vertexes of the triangle, M is the midpoint of side BC, and $H_1$ is the intersection of side BC and a straight line drawn from vertex A so as to be perpendicular to the opposite side BC.

The receivers 21, 22, and 24 receive a signal transmitted by the transmitter 31, each recording the time the signal has arrived. Let $t_1$ be the difference in signal reception time between two receivers 21 and 24. This reception time difference $t_1$ has a negative value when the latter receiver 24 receives the signal earlier than the former receiver 21. Likewise, let $t_2$ be the difference in signal reception time between two receivers 21 and 22. This reception time difference $t_2$ has a negative value when the latter receiver 22 receives the signal earlier than the former receiver 21. Further, let t be A-to-B propagation time, i.e., the time the signal transmitted at point A (transmitter 31) arrives at point B (receiver 21). Then $t+t_1$ means; A-to-M propagation time, i.e., the time the signal transmitted at point A (transmitter 31) arrives at point M (receiver 24). Similarly, $t+t_2$ means A-to-C propagation time, i.e., the time the signal transmitted at point A (transmitter 31), arrives at point C (receiver 22). Because M is the midpoint of side BC, a geometry theorem about median of triangles gives us the following equation.

$$AB^2+AC^2=2(AM^2+BM^2) \tag{1}$$

and therefore, $$AM=((AB^2+AC^2)/2-BM^2)^{1/2} \tag{2}$$

On the other hand, the lengths of sides AB, AC, and AM can be represented as:

$$AB=s \times t \tag{3}$$

$$AC=s \times (t+t_2) \tag{4}$$

$$AM=s \times (t+t_1) \tag{5}$$

where s is propagation speed, and t, $t+t_1$, and $t+t_2$ are the times it takes for the transmitter signal to reach the points B, M, and C, respectively. By substituting equations (3) and (4) for AB and AC in equation (2), we obtains the following:

$$AM=((st)^2+(s(t+t_2))^2)/2-BM^2)^{1/2} \tag{6}$$

The combination of two equations (5) and (6) gives the time t as follows.

$$s(t+t_1)=(((st)^2+(s(t+t_2))^2)/2-BM^2)^{1/2} \tag{7}$$

$$t=((st_2)^2 \cdot 2BM^2 - 2(st_1)^2)/(4st_1^2 \cdot 2s^2 t_2) \tag{8}$$

Because all the right-side variables s, $t_1$, $t_2$, and length BM are known in equation (8), the value of t can be obtained by giving specific values to them. Now that s, t, $t_1$, and $t_2$ have been figured out, the length of side AB can be calculated from equation (3), as is the length of side AC from equation (4).

The above steps have brought us the length of every side AB, AC, and BC of the given triangle. Let $c_1$, $b_1$, and $a_1$ be the respective lengths of sides AB, AC, and BC, and apply them to Heron's formula to calculate the area S of triangle ABC.

$$S=(\alpha(\alpha \cdot a_1)(\alpha \cdot b_1)(\alpha \cdot c_1))^{1/2} \tag{9}$$

where $\alpha=(AB+AC+BC)/2$. Then $AH_1$ and $BH_1$ are:

$$AH_1=2S/BC \tag{10}$$

$$BH_1=(AB^2 \cdot AH_1^2)^{1/2} \tag{11}$$

Figure 10:
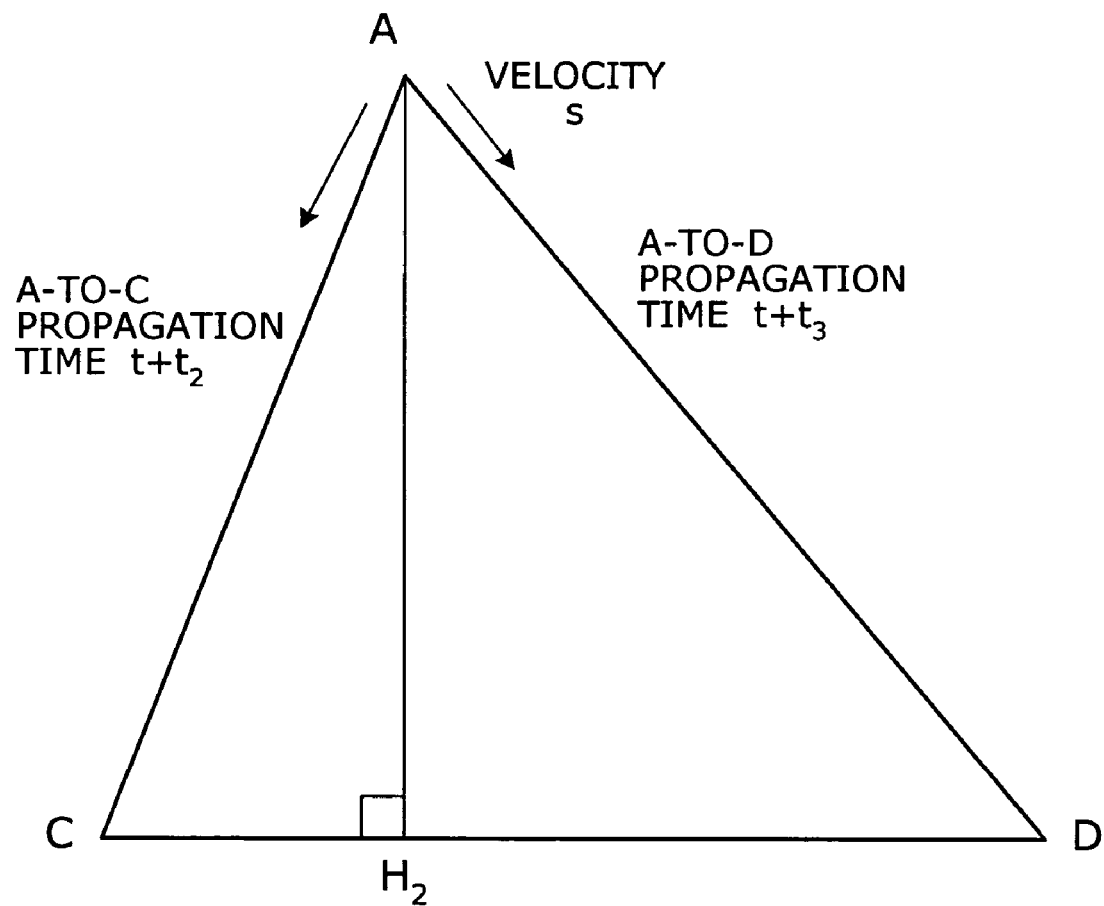
FIG. 10 shows a triangle ACD.

Obviously, the same process can be used to calculate dimensions of another triangle ACD formed by the transmitter 31 and receivers 22 and 23. FIG. 10 shows this triangle ACD, where A, C, and D are vertexes, and H2 is the intersection of side CD and a straight line drawn from vertex A so as to be perpendicular to the opposite side CD. Known parameters in this case are: length of sides AC, length of side CD, propagation speed s, and propagation times $t+t_2$ and $t+t_3$. By substituting those known values for respective variables, the length AD is obtained as follows:

$$AD=s(t+t_3) \tag{12}$$

Now, that we have the lengths of all three sides AC, AD, and CD of the triangle ACD, its area $S_2$ can be calculated using Heron's formula.

$$S_2=(\beta(\beta \cdot a_2)(\beta \cdot c_2)(\beta \cdot d_2))^{1/2} \tag{13}$$

where $d_2$, $c_2$, and $a_2$ are the respective lengths of sides AC, AD, and CD, and $\beta=(AC+AD+CD)/2$.

The lengths of $AH_2$ and $CH_2$ are as follows:

$$AH_2=2S_2/CD \tag{14}$$

$$CH_2=(AC^2 \cdot AH_2^2)^{1/2} \tag{15}$$

Figure 11:
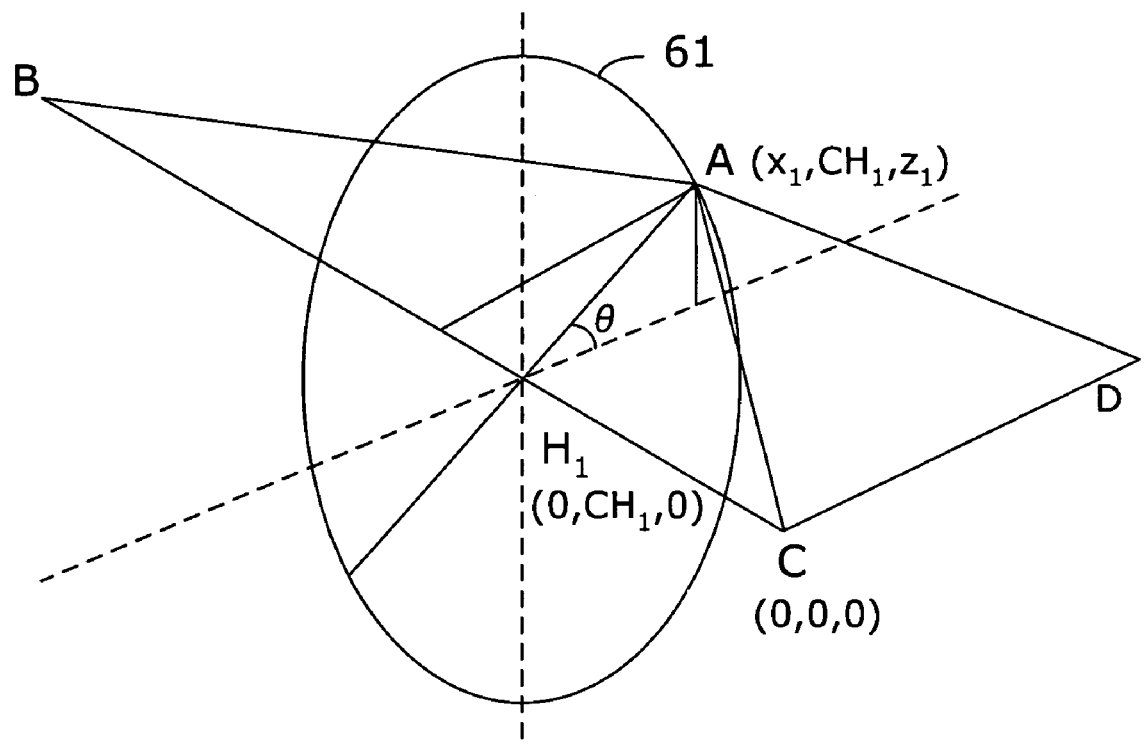
FIG. 11 shows schematically a three-dimensional measurement space.

The dimensions of triangles ABC and ACD obtained in the above section permit us to calculate the coordinates of point A. FIG. 11 shows schematically the three-dimensional measurement space. It is assumed here that the origin (0, 0, 0) of this measurement space is at point C, and X and Y axes are in the directions of CD and CB, respectively. The coordinates of point $H_1$ is expressed as (0, $CH_1$, 0). The vehicle 200 under test is assumed to reside in the first quadrant of XY plane, on the positive section of Z axis. Consider a circle 61 perpendicular to Y axis (or side CB), with $H_1$ as the center and with $AH_1$ as the radius. This circle 61 is represented as follows.

$$x^2+z^2=AH_1^2 \tag{16}$$

Let $x_1$ and $z_1$ be unknown coordinates of point A ($x_1$, $CH_1$, $z_1$) on the circle 61. These coordinates $x_1$ and, $z_1$ are expressed as:

$$x_1 = AH_1 \cdot \cos\theta$$

$$z_1 = AH_1 \cdot \sin\theta \tag{17}$$

where θ is the angle between XY plane and line $AH_1$. Finally, the coordinates ($x_1$, $CH_1$, $z_1$) of point A is determined by finding a value of θ at which the length of AD as the function of θ is the closest to the measured length of AD in equation (12). While the above process locates a single transmitter, the positions of other transmitters on the vehicle 200 can also be calculated in the same way.

Figure 12:
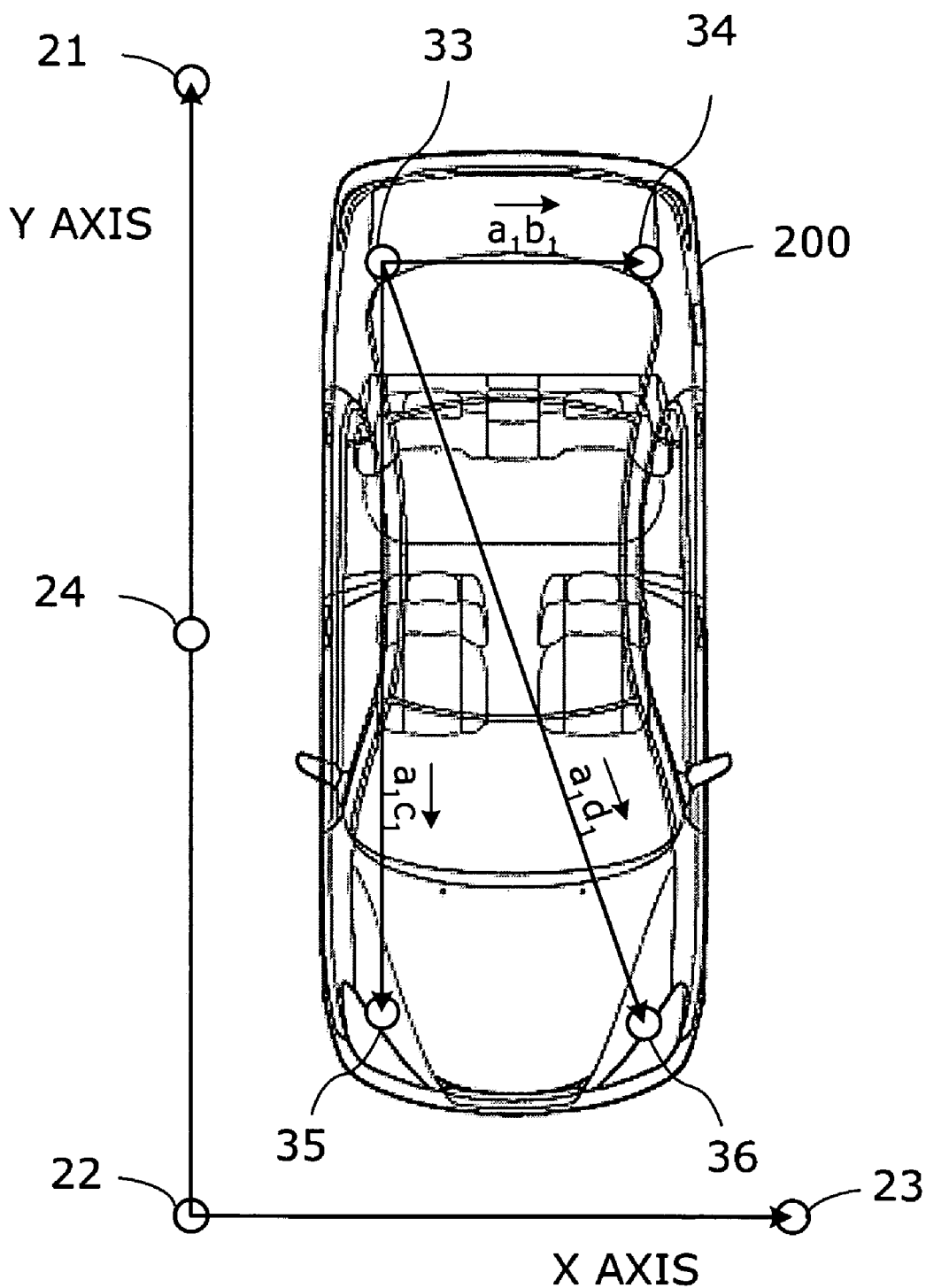
FIG. 12 shows a vehicle placed exactly at a predetermined position.

The above-described measurement of transmitter positions is then followed by a process of coordinate correction. Referring first to FIG. 12, part coordinates stored in the part position table 110 will be explained below.

FIG. 12 shows an ideal arrangement, where a vehicle 200 is placed exactly at a predetermined position in the three-dimensional measurement space. In this example of FIG. 12, transmitters 33, 34, 35, and 36 are each disposed at four corners of the vehicle 200. The part position table 110 stores the coordinates of each transmitter-equipped component, assuming that the vehicle 200 is ideally situated as shown in FIG. 12. Those coordinate values in the part position table 110 are referred to hereafter as the "reference coordinates" of components.

Let us consider three vectors $a_1b_1$, $a_1c_1$, and $a_1d_1$ originating at the transmitter 33 and pointing at the other three transmitters 34, 35, and 36, respectively. As shown in FIG. 12, the coordinate system is such that its origin is the point where the receiver 22 lies, X and Y axes respectively extend toward the receivers 23 and 21, and Z axis is normal to XY plane.

Generally, when setting a damaged vehicle 200 in the test site, it is very difficult to position the vehicle 200 exactly at a desired place in the measurement space. Although you may be able to locate a vehicle in such a way that its tires are at the right places, the vertical (Z axis) position of the body would be different from the assumed position if, for example, one of its tires is punctured. Or, if the frame is deformed, you can never put the tires at the right places. Thus, in such real life situations, the measured coordinates of on-vehicle transmitters 33, 34, 35, and 36 inevitably involve a certain amount of position offset of the vehicle 200.

Figure 13:
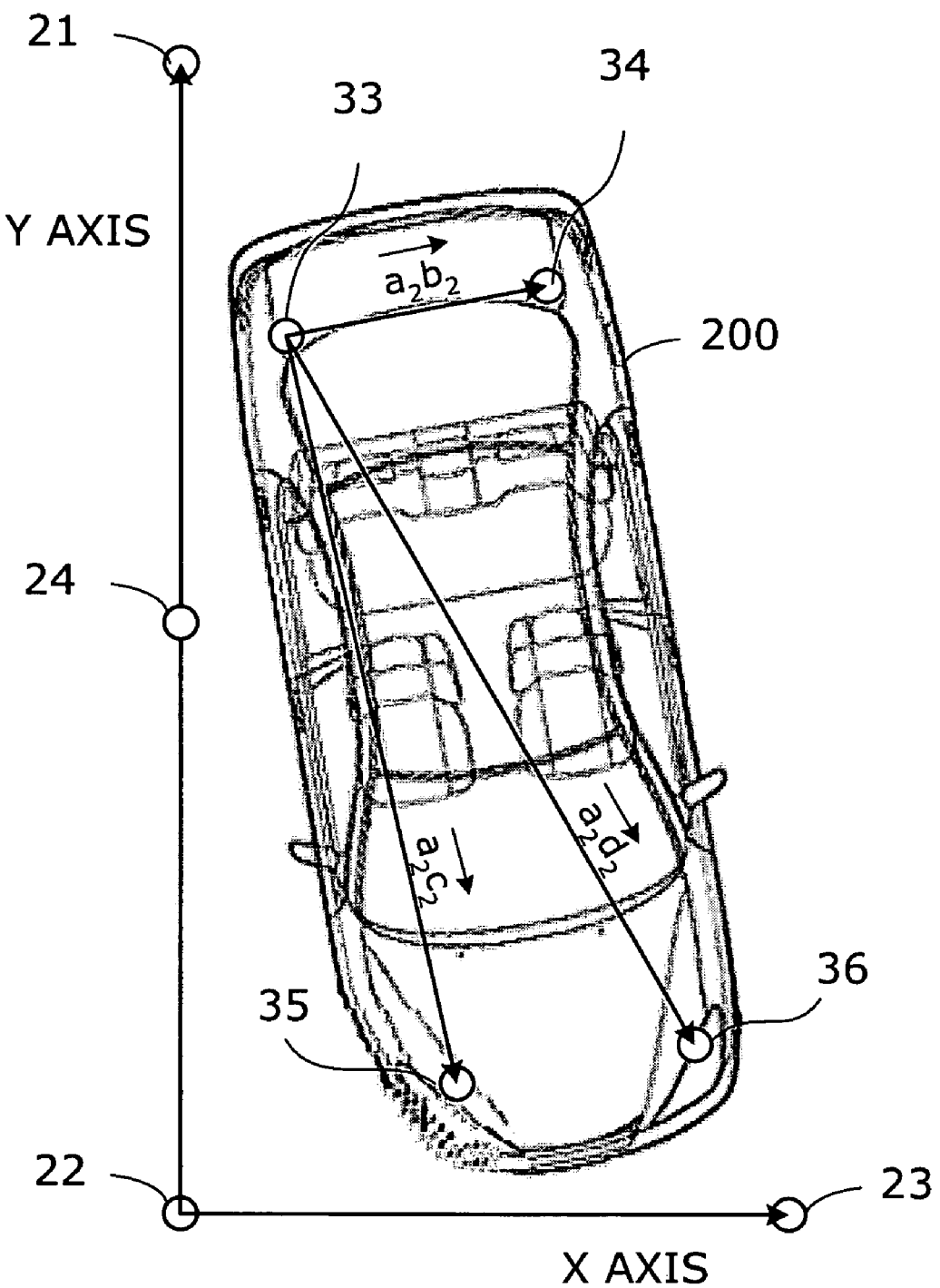
FIG. 13 shows a vehicle with a position offset.

FIG. 13 shows a vehicle with a position offset. The illustrated vehicle 200 is damaged around a transmitter 35, while there is no damage to other transmitters 33, 34, and 36. Because of the presence of offset, every transmitter 33, 34, and 36 would appear to have been displaced unless an appropriate correction is made on their measured coordinates (i.e., the transmitter positions identified by the measurement process). Let us consider three vectors $a_2b_2$, $a_2c_2$, and $a_2d_2$ originating at the transmitter 33 and pointing at the other three transmitters 34, 35, and 36, respectively. The damaged part detector 140 then corrects the measured coordinates of on-vehicle transmitters 33, 34, and 36 as will be described below.

Figure 14:
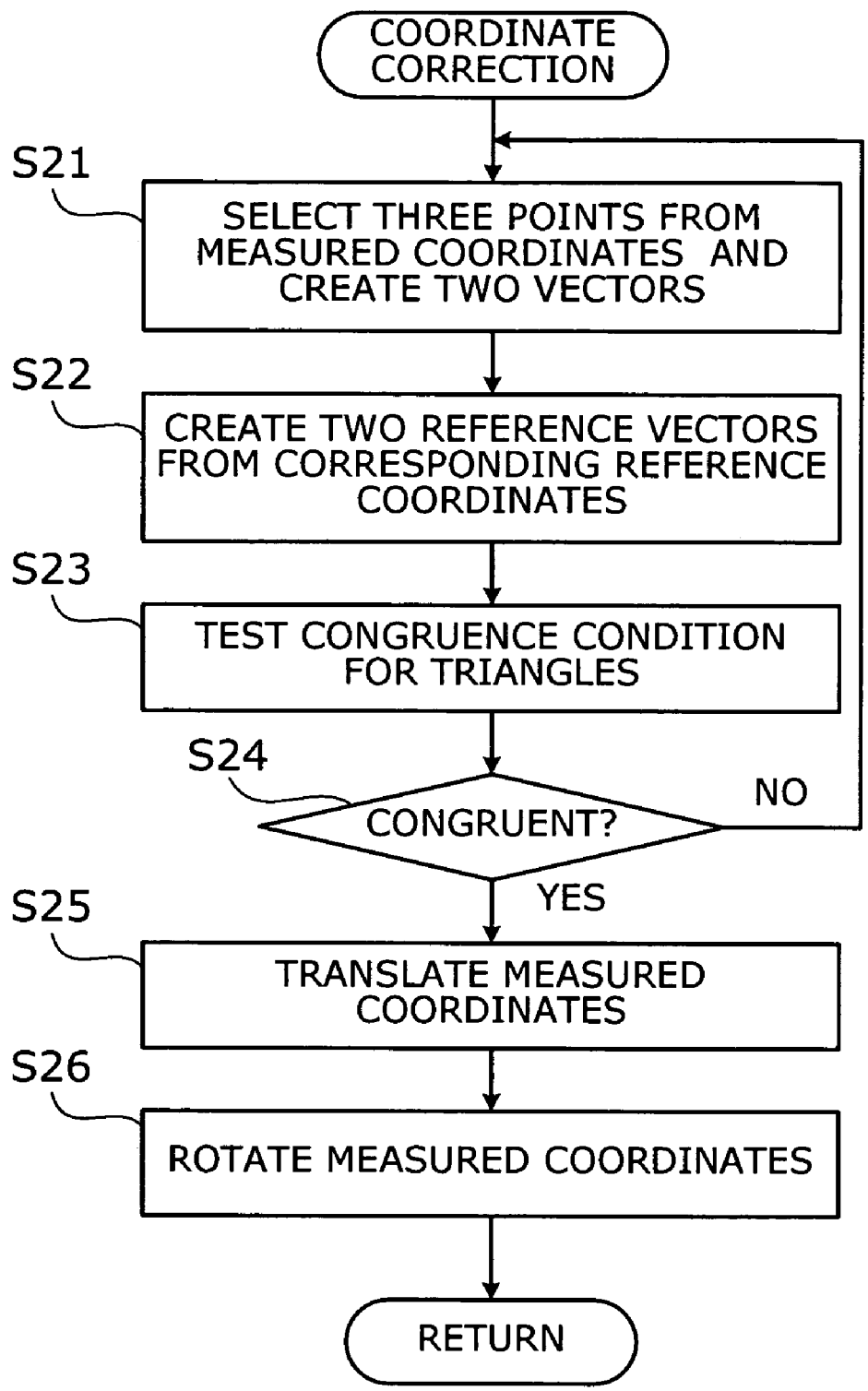
FIG. 14 is a flowchart of a process to correct measured coordinates.

FIG. 14 is a flowchart of a process to correct measured coordinates. This process is broadly divided into two sections. The first section, steps S21 to S24, is to identify some transmitters that are correctly positioned (in other words, those attached to undamaged components), from among the entire set of transmitters on the vehicle. The second section, steps S25 and S26, is to derive a coordinate correction formula from data of the selected transmitters and correct measured coordinates of every transmitter. The following explains the process in the order of step numbers.

(S21) The damaged part detector 140 selects three points from among the measured coordinates of transmitters. It then designates one of the three points as the reference point and defines two vectors each directed to the other points, with the reference point as their common origin.

In the example of FIG. 13, three transmitter 33, 34, and 36 are selected and the first transmitter 33 is designated as the reference point. One vector $a_2b_2$ is directed from this reference point to the second transmitter 34, and another vector $a_2d_2$ is directed to the third transmitter 36.

(S22) The damaged part detector 140 creates two reference vectors using the reference coordinates corresponding to the three points selected at step S21.

In the present example, three transmitters 33, 34, and 36 have been selected at steps S21, the first transmitter 33 being designated as the reference point. Then step S22 creates, in the reference coordinate domain, two vectors $a_1b_1$ and $a_1d_1$ originating at the reference point transmitter 33 and pointing at the other transmitters 34 and 36, respectively.

(S23) The measured coordinates of the three points selected at step S21 form a triangle, as do the three corresponding reference coordinates obtained at step S22. The damaged part detector 140 now tests the congruence of those two triangles. If they are congruent, the damaged part detector 140 determines that the three transmitters are located at their normal positions (i.e., not displaced).

More specifically, one of the well-known congruence conditions for triangles states that if two sides and the included angle of one triangle are respectively equal to two sides and the included angle of another triangle, then the triangles are congruent. This condition is now examined for two pairs of vectors obtained at steps S21 and S22. Specifically, it is tested whether vectors $a_1b_1$ and $a_2b_2$ are equal in length. Then it is tested whether vectors aids and $a_2d_2$ are equal in length. Lastly, it is tested whether the angle between vectors $a_1b_1$ and $a_1d_1$ is equal to that between vectors $a_2b_2$ and $a_2d_2$. If all those three tests are positive, the two triangles are proved to be congruent.

(S24) The damaged part detector 140 sees the result of step S23. If the congruence is proved at step S23, then the process advances to step S25. If not, the process goes back to step S21 to select a different set of transmitters. In this way, the loop S21-S24 makes an exhaustive search for a set of three vertex points that satisfy the congruence condition for triangles, thus finally identifying three normal, non-displaced transmitters.

Referring back to the example of FIG. 13, the transmitter 35 is displaced at the crash, and therefore, the congruence test should fail if the transmitter 35 is chosen as one of the three points. The combination of transmitters 33, 34, and 36, on the other hand, will pass the test of congruence between a measured-coordinate triangle and its corresponding reference-coordinate triangle because those transmitters are kept intact.

With the satisfactory set of transmitters, the damaged part detector 140 derives a coordinate correction formula from their coordinates and corrects the measured coordinates of every transmitter using that formula in the following steps.

(S25) The damaged part detector 140 translates measured coordinates of all transmitters by the difference between the measured coordinates (ax, ay, zy) and reference coordinates (bx, by, zy) of the reference point (transmitter 33). The amount of this translation is represented as a vector (mx, my, mz), where mx=bx−ax, my=by−ay, and mz=bz−az.

(S26) The damaged part detector 140 calculates a difference in direction between two vectors, one with measured coordinates and the other with reference coordinates, that originate from the reference point transmitter and point at one of the remaining two transmitters. The damaged part detector 140 then rotates all the measured coordinates of transmitters around the reference point by the amount of the calculated differential angle.

More specifically, vector $a_1 b_1$ is a vector with reference coordinates, directed from the references point transmitter 33 to another transmitter 34, while vector $a_2 b_2$ is a vector with measured coordinates that corresponds to the vector $a_1 b_1$. The damaged part detector 140 determines the angle θ between those two vectors $a_1 b_1$ and $a_2 b_2$ by calculating their inner product. It also obtains a unit vector v (vx, vy, vz) normal to the two vectors $a_1 b_1$ and $a_2 b_2$ by calculating their outer product and normalizing the resulting vector components. Further, the damaged part detector 140 defines a straight line that runs in parallel with the normal vector v (vx, vy, vz), passing through the reference point (ax, ay, az). It then rotates all the measured coordinates around the straight line by the angle of θ.

The above-described correction processing of steps S25 and S26 can be represented as the following coordinate transformation formulas:

$$(cx\ cy\ cz\ 1) = (rx\ ry\ rz) UV \quad (18)$$

$$U = \begin{bmatrix} 1 & 0 & 0 & 0 \\ 0 & 1 & 0 & 0 \\ 0 & 0 & 1 & 0 \\ mx & my & mz & 1 \end{bmatrix} \quad (19)$$

$$V = \begin{bmatrix} vx \cdot vx(1-\cos\theta) + \cos\theta & vx \cdot vy(1-\cos\theta) - vz \cdot \sin\theta & vz \cdot vx(1-\cos\theta) + vy \cdot \sin\theta & 0 \\ vx \cdot vy(1-\cos\theta) + vz \cdot \sin\theta & vy \cdot vy(1-\cos\theta) + \cos\theta & vy \cdot vz(1-\cos\theta) - vx \cdot \sin\theta & 0 \\ vz \cdot vx(1-\cos\theta) - vy \cdot \sin\theta & vy \cdot vz(1-\cos\theta) + vx \cdot \sin\theta & vz \cdot vz(1-\cos\theta) + \cos\theta & 0 \\ 0 & 0 & 0 & 1 \end{bmatrix} \quad (20)$$

where (rx, ry, rz) is the original transmitter coordinates before transformation, and (cx, cy, cz) is the coordinates after transformation.

The damaged part detector 140 corrects measured coordinates of transmitters through the above steps and compares them with corresponding reference coordinates, thus detecting displacement of each transmitter-equipped component. With the displacement obtained in this way, the damaged part detector 140 consults the part position table 110 to determine the degree of damage influence. It then extracts from the influence range table 120 the components that fall within the influence range, thereby identifying damaged parts.

Figure 15:
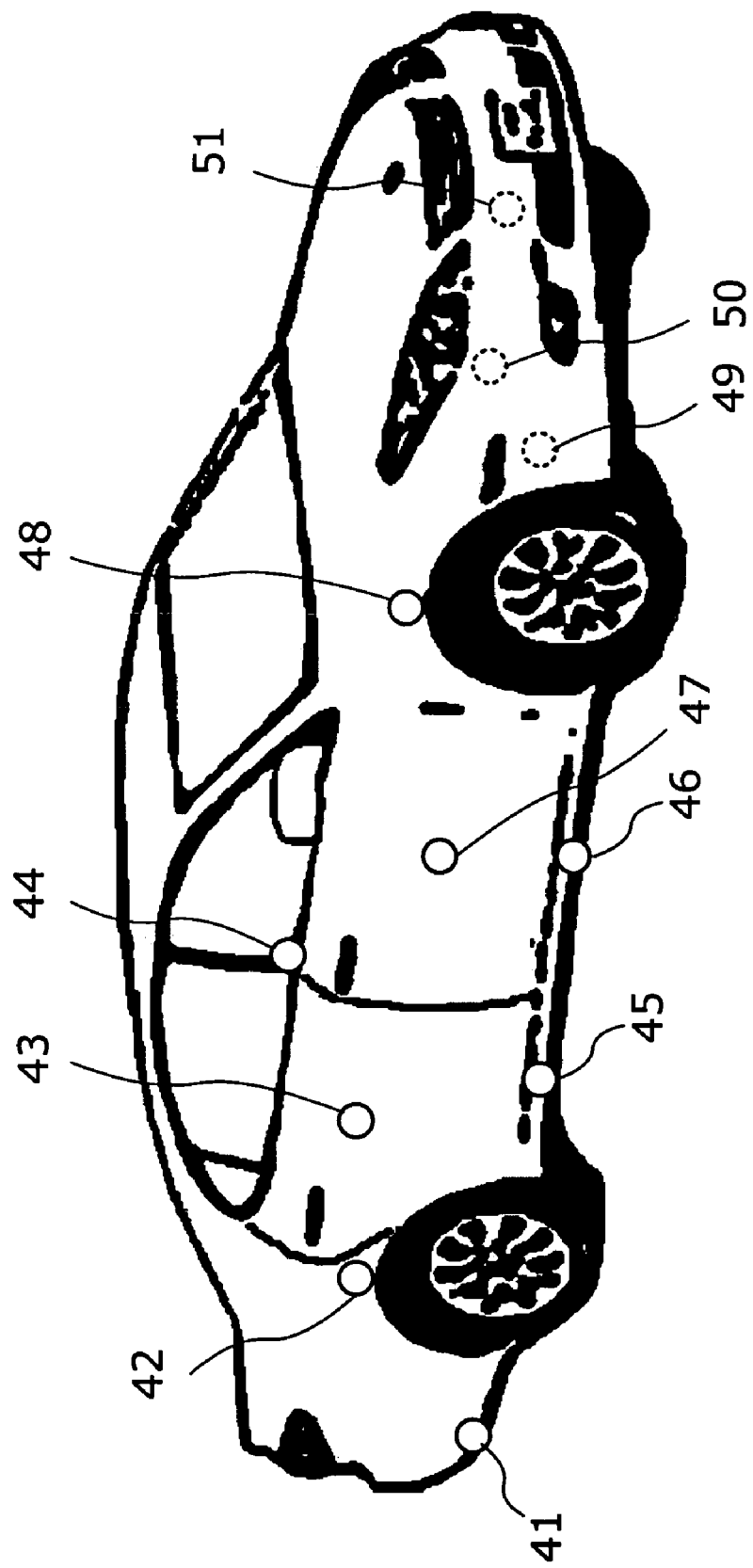
FIG. 15 shows an example of a vehicle in normal state.
Figure 16:
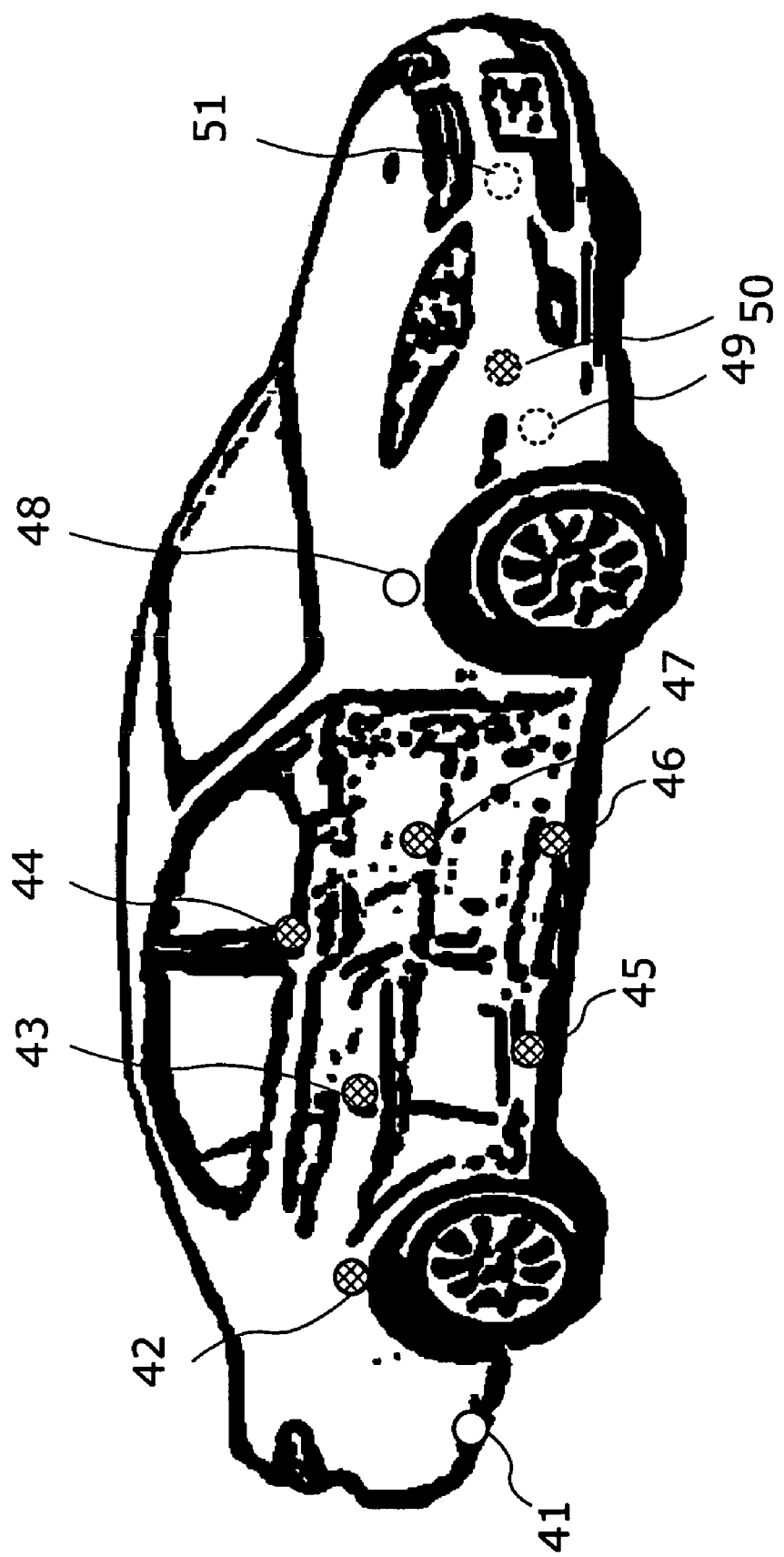
FIG. 16 shows an example of a vehicle after accident.

Referring to FIGS. 15 and 16, the following section will give an example of damaged parts detection. FIG. 15 shows an example of a vehicle 200 in normal state. The vehicle 200 is equipped with many transmitters 41 to 51 on its main components. Specifically, some transmitters 41 to 48 are attached to outer parts (e.g., doors, bumpers, fenders), while other transmitters 49 to 51 are attached to inner parts (e.g., suspension, gearbox, engine mount).

FIG. 16 shows an example of the vehicle 200 after an accident. In this example, the vehicle 200 has suffered a large deformation on its right side. Accordingly, the transmitters 42 to 47 on the front door, rear door, and fender on the right side indicate anomalies (displacement). In addition, the transmitter 50 attached to the gear box, an inner part, exhibits anomalies. On the other hand, the remaining transmitters 41, 48, and 49 attached respectively to the rear bumper, front fender, and front suspension are all normal (no displacement). As this example demonstrates, the system according to the present embodiment easily finds out damage to the components that cannot be viewed from outside. Accordingly, the car dealer and repair shop can estimate accurately and promptly the cost for repairing a vehicle damaged in an accident when it is brought into their factory. Besides, the system enables them to produce a correct order for spare parts that are necessary for repairs.

While thee above description has assumed the use of electromagnetic waves for signal transmission, it is not intended to limit the invention to this specific medium. Other types of signals such as ultrasonic waves may also be used in implementing on-vehicle transmitters for damaged parts detection.

Also, while the above description has presented such a structure where the transmitter locator 130 is integrated in the damaged part detection device 100, it is not intended to limit the present invention to that specific arrangement. Alternatively, the transmitter locator 130 may be implemented in the form of a separate piece of equipment that is linked to the damaged part detection device 100 as one of its peripherals.

Further, the above embodiment evaluates the amount of displacement of each transmitter to identify damaged components. It is also possible, however, to examine the direction of displacement as an additional factor indicating damage. In this case, the displacement tolerances in the part position table 110 may be defined for each direction, and the influence ranges may be determined according to the combination of particular displacement tolerance and displacement direction.

The present invention may be combined with a probing techniques for houses and buildings. More specifically, transmitters are placed at inner structures of a house when it is built. Those transmitters allow us to measure the strain that has occurred to the structure, without the need for removing the walls.

The above-described processing mechanisms of the present invention are actually implemented on a computer system, in which the functions of detecting damaged parts are encoded in the form of computer programs. A computer system executes such programs to provide the intended functions of the present invention. For the purpose of storage and distribution, those programs are stored in a computer-readable storage medium. Suitable computer-readable storage media are, for example, magnetic storage media, optical discs, magneto-optical storage media, and solid state memory devices. Magnetic storage media include hard disk drives (HDD), flexible disks (FD), and magnetic tapes. Optical discs include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for commercial circulation of programs. Network-based distribution of software programs is also possible in which case master program files stored in a server computer are downloaded to user computers via a network.

User computers keep necessary programs in their local storage unit, which have previously been installed from a portable storage medium or downloaded from a server computer. The user computer performs intended functions by executing the programs read out of the local storage unit. As an alternative way of program execution, the computer may execute programs directly from a portable storage medium. Another alternatives method is that a user computer dynamically downloads programs from a server computer when they are demanded and executes them upon delivery.

To summarize the above description, the method of the present invention measures the positions of transmitters disposed in a vehicle and identifies damaged parts based on the displacement of those transmitters. This method makes it easy to survey the damage insider the vehicle.

The foregoing is considered as illustrative only of the principles of the present invention. Further, since numerous modifications and changes will readily occur to those skilled in the art, it is not desired to limit thee invention to the exact construction and applications shown and described, and accordingly, all suitable modifications and equivalents may be regarded as falling within the scope of the invention in the appended claims and their equivalents.

What is claimed is:

1. A method for detecting damaged parts, comprising the steps of:
   (a) measuring a position of a transmitter by processing a transmitter signal received by a plurality of receivers, the transmitter being attached at a predetermined point of a vehicle;
   (b) calculating displacement of the transmitter by comparing the measured position with a reference position of the transmitter, the reference position being a position at which the transmitter is supposed to be when the vehicle is in normal state; and
   (c) identifying damaged parts around the transmitter, based on the displacement of the transmitter.

2. The method according to claim 1, wherein said measuring step (a), determines the position of the transmitter based on reception times of the transmitter signal at the plurality of receivers.

3. The method according to claim 1, wherein said identifying step (c) identifies the damaged components, consulting a database that stores predetermined influence ranges associated with different amounts of displacement and lists of components that fall within each of the influence ranges.

4. The method according to claim 1, wherein the transmitter signal delivers an identification code of the transmitter.

5. The method according to claim 1, wherein the transmitter signal passes through outer parts of the vehicle.

6. The method according to claim 5, wherein the transmitter produces electromagnetic waves as the transmitter signal.

7. The method according to claim 1, further comprising the step of correcting the measured position of the transmitter to cancel a position offset of the vehicle.

8. The method according to claim 1, further comprising the steps of:
   searching a database for part numbers of spare parts that are required for replacement of the damaged parts; and
   sending ordering information for the spare parts to a parts order server over a network.

9. A device for detecting damaged parts, comprising:
   a plurality of receivers that receives a transmitter signal sent from a transmitter attached at a predetermined point of a vehicle;
   a transmitter locator that measures a position of the transmitter by processing the transmitter signal received by the receivers;
   a displacement calculator that calculates displacement of the transmitter by comparing the measured position with a reference position of the transmitter, the reference position being a position at which the transmitter is supposed to be when the vehicle is in normal state; and
   a damaged part detector that identifies damaged parts around the transmitter, based on the displacement of the transmitter.

10. A program product for detecting damaged parts, the program product causing a computer system to execute a process comprising the steps of:
    (a) measuring a position of a transmitter by processing a transmitter signal received by a plurality of receivers, the transmitter being attached at a predetermined point of a vehicle;
    (b) calculating displacement of the transmitter by comparing the measured position with a reference position of the transmitter, the reference position being a position at which the transmitter is supposed to be when the vehicle is in normal state; and
    (c) identifying damaged parts around the transmitter, based on the displacement of the transmitter.

11. A computer-readable storage medium that stores a program for detecting damaged parts, the program causing a computer system to execute a process comprising the steps of:
    (a) measuring a position of a transmitter by processing a transmitter signal received by a plurality of receivers, the transmitter being attached at a predetermined point of a vehicle;

(b) calculating displacement of the transmitter by comparing the measured position with a reference position of the transmitter, the reference position being a position at which the transmitter is supposed to be when the vehicle is in normal state; and (c) identifying damaged parts around the transmitter, based on the displacement of the transmitter.

* * * * *